Dec. 1, 1936.  F. PAGLIARI  2,062,603
TUNING INDICATOR
Filed Feb. 15, 1935

INVENTOR
F. PAGLIARI
BY
ATTORNEY

Patented Dec. 1, 1936

2,062,603

UNITED STATES PATENT OFFICE 2,062,603

TUNING INDICATOR

Francesco Pagliari, Milan, Italy, assignor to Radio Corporation of America, a corporation of Delaware Application February 15, 1935, Serial No. 6,647
In Germany March 26, 1934

5 Claims. (Cl. 116—124.3)

This invention relates to a reading device or indicator for the wave length to which a radio set is tuned. Reading devices are known in which a hand moves along or over a linear scale with which the set is furnished. These devices have the drawback that the rotary motion of the tuning member must be transformed into a linear motion. As an improvement it has been proposed to couple with the tuning member a drum which is movable about its axis and on which one or more curves are plotted, and a linear graduation being provided in parallel with the shaft of said drum in the vicinity of the periphery of the latter. Upon rotation of the drum the point of intersection of one of the curves with the scale moves along the scale and indicates the wave length to which the set is tuned. However, this arrangement has the drawback of a special coupling being required between the tuning member and the drum by which the assembly is fairly complicated.

In addition all of the devices above referred to have the drawback that if an accurate reading is desired, the dial must have a fairly great length so that it is very clumsy. In another known device this drawback is avoided by providing the set with a number of gaps which lie in parallel with and adjacent each other and behind which is provided a member having a bevelled edge which performs a translatory motion so that the edge is successively visible through each of the gaps. In this manner the scale is divided in several small scales, but also in this case the rotary motion of the tuning member must be transformed into a translatory motion of the indicator.

The present invention has for its purpose to provide a reading device which is easily read and has a simple construction and to which the drawbacks of the known devices are not inherent.

The device according to the invention comprises a rotary plate which is coupled with the tuning member and provided with several curves which can be moved along a number of linear scales lying adjacent each other in such a manner that each curve corresponds to one of the scales. The arrangement is such that upon rotation of the plate all the curves move successively along the corresponding scales.

For a better understanding of the invention reference is made to the accompanying drawing in which.

Figure 1:
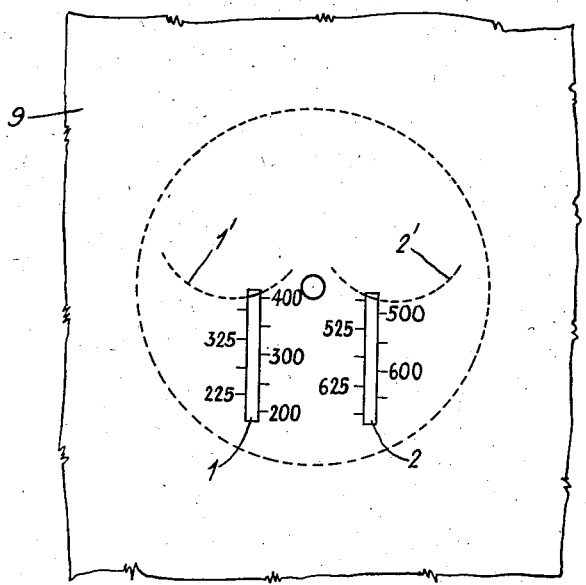
Fig. 1 is a front view of an indicator embodying the invention.
Figure 2:
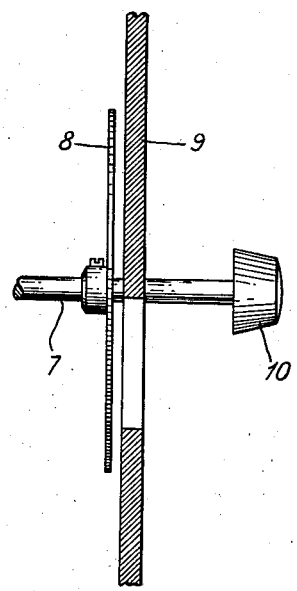
Fig. 2 is a partial section through the indicator of Fig. 1.

In Fig. 1 two vertical openings or gaps 1 and 2 are provided in the front plate or panel 9 of a radio set along which gaps wave length graduations are provided. Behind the front plate is provided a disc 8 which is secured to a rotary shaft 7 and on which are provided the curves 1' and 2'. Upon rotation of the disc in an anti-clockwise direction by the control knob 10 the curve 1' moves along the opening 1 so that part of the curve is visible through the opening, which part moves downwardly upon rotation and serves as an index to indicate the wave length. Upon rotation through 90° the visible or outer part of the curve reaches the bottom end of the scale. Upon rotation in a clockwise direction from the starting position shown in Fig. 1, part of the curve 2' will be visible through the gap 2 while curve 1' is concealed by panel 9. Over one half of the tuning range, therefore, one scale serves for the reading, whereas the other scale is used for the other half.

Figure 3:
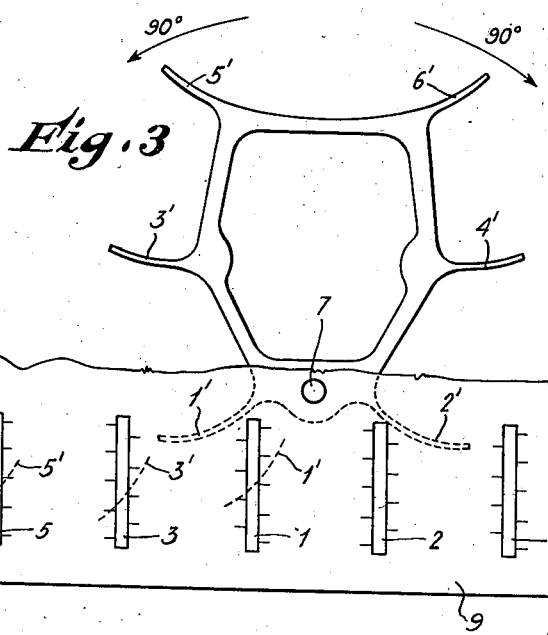
Fig. 3 is a front view of a modified form of indicator.
Figure 4:
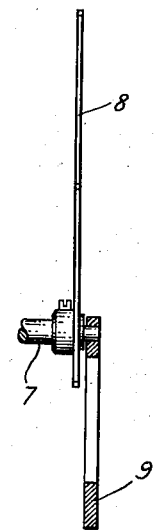
Fig. 4 is a section through the indicator of Fig. 3.

Fig. 3 shows a device comprising six dials. Through each of the gaps 1 to 6 part of each of the curves 1' to 6' is successively visible. In this case the panel is broken off at the top to show member 8 but the top of the panel extends high enough to conceal it, as in Fig. 1.

By a proper choice of the form of the curves a definite relation may be established between the movement of the curve part visible at each instance and the tuning of the set. However in the form of construction illustrated the curves are so shaped that the angle enclosed by the gap and the touching line at the angle enclosed by the gap and the touching line at the visible part of the curve always remains constant which has the advantage that the length of the visible part is constant.

While in the construction shown, the disc 8 has been shown mounted behind the front panel or plate, this relative position of these parts is not necessary to my invention. While the disc 8 is shown mounted on the shaft 7 of the tuning condenser, it will be understood that it may be indirectly connected to it by any means well known to those skilled in the art.

Having described my invention what I claim and desire to secure by Letters Patent is:

1. Means for indicating the position of a tuning device comprising in combination, a panel having a plurality of graduated frequency indicating scales thereon, a rotary member mounted behind said panel and connected with said device, a plurality of marks so positioned on said member that each mark lies adjacent a different one of said scales in response to adjustment of said tuning device and said panel having an extended area overlying said rotary member whereby it conceals one of said marks when the other mark is adjacent its corresponding scale.

2. Means for indicating the position of a tuning device comprising in combination, a panel having a plurality of parallel openings therein, a scale adjacent each opening, a rotary member connected to said device mounted behind said openings and having a plurality of indicators thereon, each of said indicators being movable behind a separate one of said openings to indicate the position of said tuning device.

3. In a device for indicating the position of a tuning means, a panel having a plurality of parallel openings therein, a rotary member connected to said tuning means and mounted behind said openings, and a plurality of indicators on said rotary member each arranged to move behind only one of said openings as said tuning means is adjusted.

4. In a device for indicating the position of a tuning means, at least two pairs of parallel scales, a shaft connected to said tuning means and positioned between said pairs of scales, a member secured to said shaft and having two pairs of index portions, one pair of index portions being arranged to cooperate only with the scales at one side of said shaft and the other pair of index portions being arranged to cooperate only with the scales at the other side of said shaft.

5. Means for indicating the position of a tuning device comprising the combination of a panel having a plurality of openings therein, a scale adjacent each opening, a rotary member connected to said device mounted at the rear of said panel and having a plurality of indicators thereon each of said indicators being movable behind a different one of said openings in response to adjustment of said tuning device, and the lengths of said indicators visible through said respective openings being substantially equal.

FRANCESCO PAGLIARI.